Dec. 16, 1958 W. M. BOOTH 2,864,464
COMBINATION AIR FILTER AND LUBRICATOR
Filed July 18, 1955 3 Sheets-Sheet 1

INVENTOR.
William M. Booth
BY
ATTORNEY

Dec. 16, 1958  W. M. BOOTH  2,864,464
COMBINATION AIR FILTER AND LUBRICATOR
Filed July 18, 1955  3 Sheets-Sheet 2

INVENTOR.
William M. Booth
BY
*Peter P. Price*
ATTORNEY

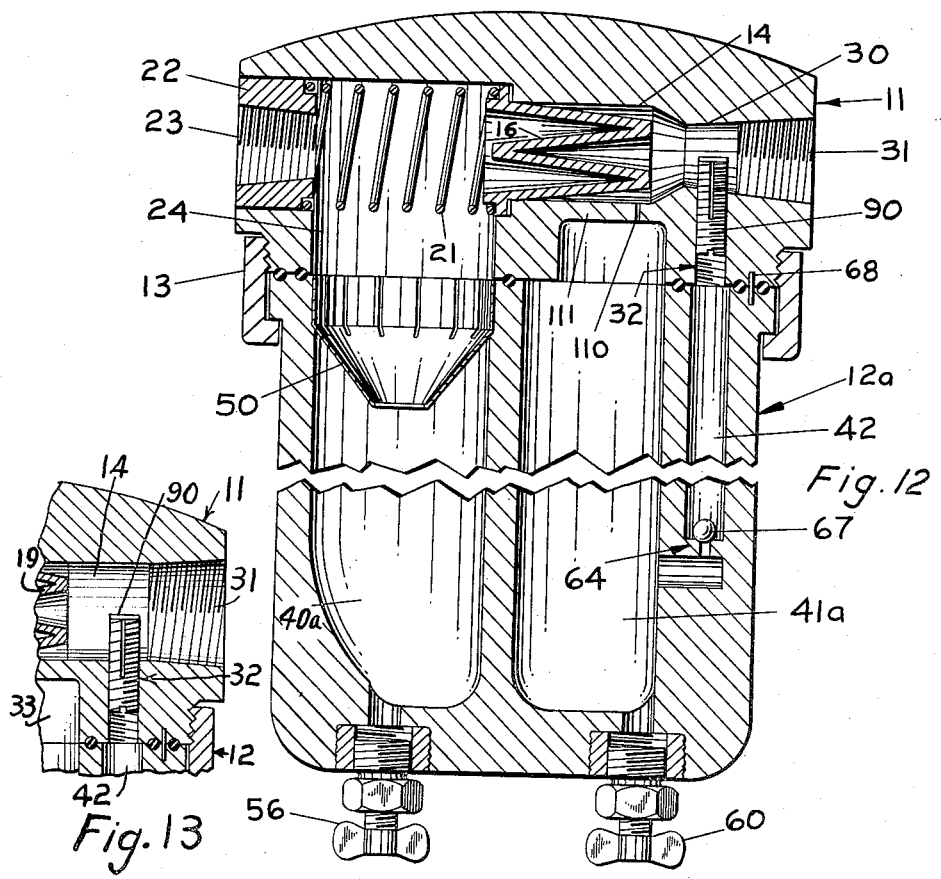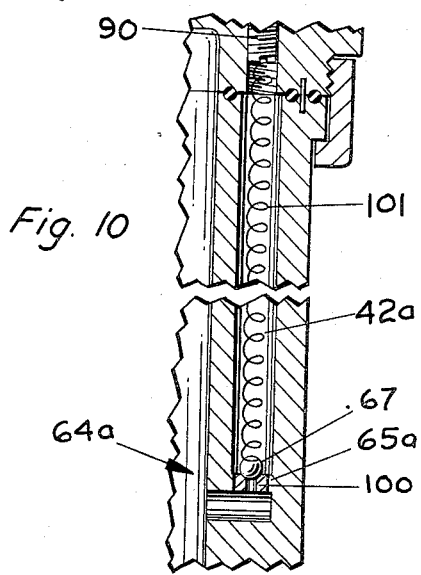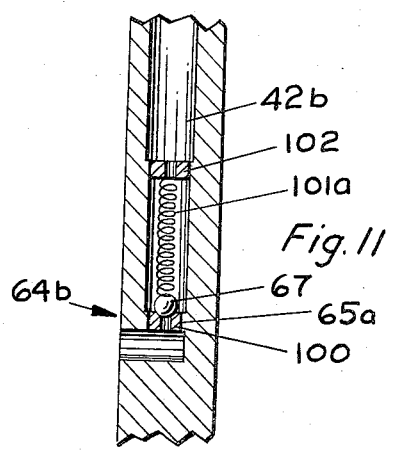

United States Patent Office 2,864,464
Patented Dec. 16, 1958

2,864,464

COMBINATION AIR FILTER AND LUBRICATOR

William M. Booth, Spring Lake, Mich., assignor to Gardner-Denver Company, Quincy, Ill., a corporation of Delaware Application July 18, 1955, Serial No. 522,811

12 Claims. (Cl. 184—55)

This invention relates to pneumatic tools and more particularly to a combination filter and lubricator for conditioning the operating air by which pneumatic tools and like equipment are powered.

It is common practice to install a filter or a lubricator and more commonly both in the air supply line for pneumatic tools. Heretofore, these have been installed as separate elements or if they have been joined they have remained separate and distinct structures connected only by a suitable pipe serving as an air passageway such as illustrated in U. S. Patent 1,990,524. This invention, for the first time, provides a filtering and lubricating device combined and integrated in a single unit and performing both functions with a substantial improvement in overall efficiency over such units operating as separate and distinct components.

This invention also provides an axial flow air filter inserted in the main line along which the air is flowing, thus greatly reducing the number of turns the air must make in traversing the filter unit. This results in an appreciable decrease in the pressure drop resulting from the use of the filter.

The combination of the filter and the lubricator in a single unit provides a compact assembly of substantially lower cost than the two units manufactured as separate components.

This invention permits the oil chamber or reservoir to be filled without shutting off the air supply to the tool and at the same time assures proper lubrication of the tool during the filling operation.

The unit provides a device which may be used as either a filter or a lubricator unit separately and provides accurate and adjustable regulation of the quantity of oil being fed into the air. While it permits adjustability, it conceals the adjustment mechanism for the oil feed in a manner preventing being tampered with by the operators.

These and other objects and purposes of this invention will be fully understood by those acquainted with pneumatic filters and lubricators upon reading the following specification and the accompanying drawings.

In the drawings:

Fig. 3 is a sectional view taken along the plane III—III of Fig. 2.

Fig. 4 is a plan view of the funnel used in the collection chamber of this invention.

Fig. 5 is an elevation view of the upstream end of the filter element for this invention.

Fig. 6 is a central elevation view of the regulator valve between the collection and oil chambers of this invention taken along the plane VI—VI of Fig. 7 and showing the ball valve in one operating position.

Fig. 7 is a central sectional view of the regulator valve taken along the plane VII—VII of Fig. 6 and showing the ball valve in its opposite operating position.

Fig. 8 is an enlarged, partially broken and sectional view of the oil feeder used with this invention.

Fig. 9 is a sectional view taken along the plane IX—IX of Fig. 8.

Fig. 10 is an enlarged fragmentary sectional view of a modified form of the oil passage structure for this invention.

Fig. 11 is an enlarged fragmentary sectional view of a further modified structure for the oil passage for this invention.

Fig. 12 is an enlarged fragmentary view of this invention taken along the same plane as Fig. 2 but showing a modified form of the invention.

Fig. 13 is a fragmentary sectional view illustrating a modification of the air passage.

A. *Head*

In executing the objects and purposes of this invention, I have provided a combination air filter and lubricator having a head through which passes an air passage for the air supplying a pneumatically operated device. Seated in this passageway is a filter. Below the head is a bowl having three chambers, these being a collection chamber, an oil chamber and an oil passage. The collection chamber serves as a receptacle for water and particles collected by the filter. The oil chamber serves as an oil reservoir from which oil is discharged into the oil passageway. An oil feeder is provided between the oil passage and the air passage in the head adjacent the discharge port for the passage by which oil is withdrawn from the oil passage and discharged into the air stream. Oil is forced from the oil chamber into the oil feeder by a pressure differential existing between the air in the oil chamber and the air in the air passage at the point where the oil feeder communicates with it.

Referring specifically to the drawings, the numeral 10 indicates a housing having a head 11, a bowl 12 and an assembly ring 13 by which the bowl 12 is secured to the head 11.

Figure 2:
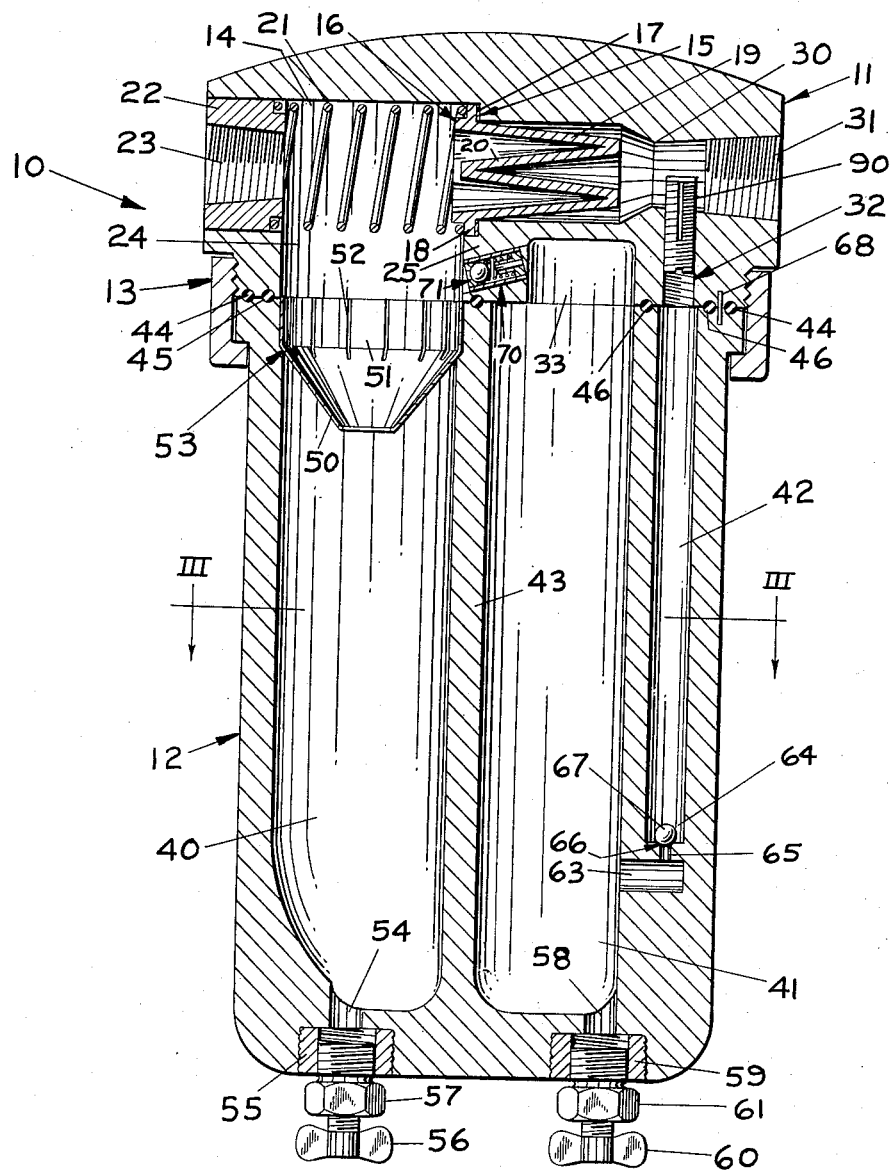
Fig. 2 is an enlarged sectional elevation view taken along the plane II—II of Fig. 1.

The head 11 has a diametric air passage 14 extending through it (Fig. 2). Approximately midway between the ends of the air passage is a shoulder 15 against which is seated the filter element 16.

The filter 16 is circular, having at its upstream end a radially projecting flange 18 designed to bear against the shoulder 15 and to support the filter against the pressure of the air passing through it. A gasket 17 of suitable material such as oil resistant rubber or felt is provided between the filter 16 and the shoulder 15. The main body of the filter consists of an outer frusto-conically shaped wall 19 and an inner conically shaped wall 20 having its apex directed upstream. The combination of the walls 19 and 20 results in a filter having a longitudinal cross sectional shape somewhat resembling that of a W. This particular arrangement of the walls 19 and 20 provides a large surface area through which the air may percolate from one side of the filter to the other. This is important to provide a filter which will operate with a minimum of pressure drop.

The filter may be made of a number of suitable materials having sufficient strength to withstand the loads imposed as the result of the pressure drop across the filter. Without in any way intending to limit the scope of this invention, it is suggested that two materials particularly suitable for this filter are a porous sintered metal and a porous ceramic, both of which should have a structure at least fifty percent void.

The filter is held in position and pressed against the shoulder 15 by a spring 21, one end of which bears against the flange 18 and the other end bears against the collar 22 press-fitted into the inlet end of the air passage 14. The collar 22 is internally threaded to provide an inlet port 23. Between the filter 16 and the collar 22, the air passage 14 opens through the bottom of the head by means of the channel 24 surrounded, in part, by the baffle 25.

Downstream of the filter 16, the air passage 14 has a restricted throat 30, serving as a Venturi. The restricted throat 30 terminates in a threaded discharge port 31. A threaded passageway 32 opening through the bottom of the head 11 communicates with the air passage 14 closely adjacent the point of maximum restriction of the throat 30 and between it and the discharge port 31.

A cavity 33 is provided in the head between the baffle 25 and the threaded passageway 32 but separated both from the air passage 14 and the threaded passage 32. The cavity 33 opens through the bottom of the head.

B. Bowl

Below the head is the tertiary chambered bowl 12, having a collection chamber 40, oil chamber 41 and an oil passage 42. The collection chamber 40 and the oil chamber 41 are separated by a vertically extending baffle 43, the upper end of which aligns with the baffle 25 of the head. All three of these chambers open through the top of the bowl with the collection chamber 40 communicating with the channel 24, the oil chamber 41 communicating with the cavity 33 and the oil passage 42 communicating with the threaded passageway 32. The bowl 12 is secured to the head by the assembly ring 13 the lower portion of which has an inturned flange to engage a peripheral flange at the top of the bowl. The assembly ring 13 is threaded and engages suitable threading on the head to clamp the bowl to the head.

To prevent leakage between the bowl and head, a gasket 44 is provided, entirely encircling the body of the bowl. A second gasket 45 prevents leakage between the collection chamber 40 and the oil chamber 41 at the joint between the head and the bowl. A third gasket 46 provides an air and oil tight seal between the oil chamber 41 and the oil passage 42 at the joint between the head and bowl. These gaskets may be of any suitable type such as an O-ring.

The collection chamber 40 has, at its upper end, a funnel 50 through which particles and water removed from the air by the filter 16 are discharged into the collection chamber (Figs. 2 and 4). The funnel has an upper rim portion 51 divided into separate segments by means of a plurality of slots 52. The slots 52 permit the rim portion 51 to be slightly compressed as the funnel is inserted into the upper end of the collection chamber 40. This compression causes the funnel to grip the walls of the chamber firmly, thus holding it in position. Where it is desired to positively prevent any possibility of the funnel slipping further into the chamber, the upper portion of the chamber 40 may be made of a slightly greater diameter than the lower portion, creating a shoulder 53 (Fig. 2), serving as a stop for the funnel.

It sometimes happens, especially when the air system is first operated, that a large quantity of water will be discharged into the collection chamber. To prevent this water from being held in the funnel 50 by trapped air beneath, the slots 52 are extended into the inclined portion of the funnel to serve as air escape ports.

A drain or cleanout port 54 is provided at the bottom of the collection chamber 40. The cleanout port 54 is surrounded by an internally threaded insert 55 through which passes the drain cock fitting 56. A valve stem 57, having a wing nut type grip, is threaded into the fitting 56 and serves as the actual shut off member.

The oil chamber 41, in the embodiment shown, is generally half-moon in shape. It is substantially larger than the collection chamber 40 (Fig. 3). At its upper end it communicates with the cavity 33 in the head. At its lower end, it is provided with a drainage and cleanout port 58 surrounding which is an internally threaded insert 59 for mounting the drain cock 60. Like the drain 56, the drain cock 60 is locked in position by a locking nut 61.

Figure 1:
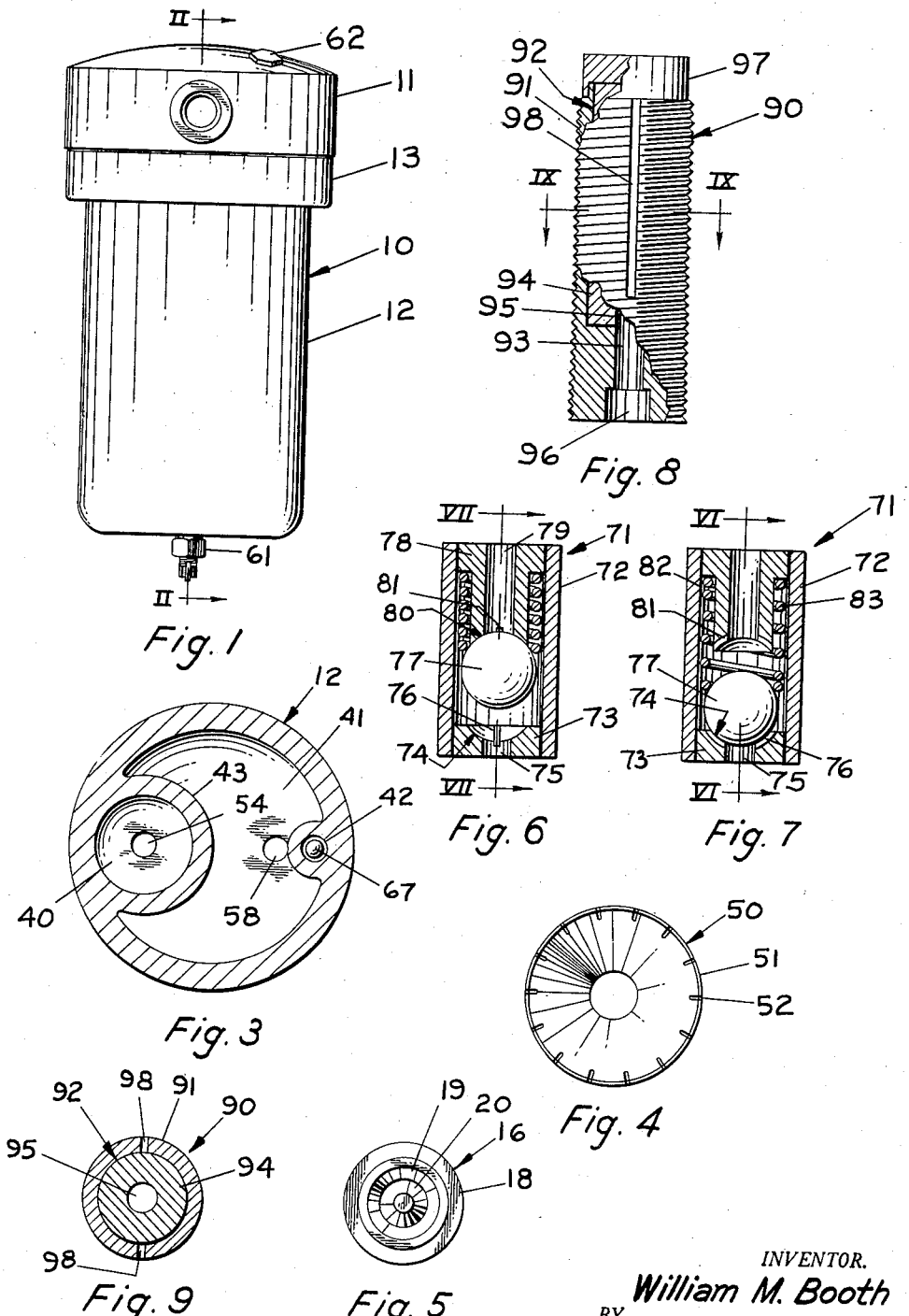
Fig. 1 is an end elevation view of this invention.

Access for the purpose of filling the oil chamber 41 may be had without separating the bowl 12 from the head 11 by means of the filler port in the head closed by the cap member 62 (Fig. 1). Upon removal of the cap 62, oil may be poured into the oil chamber 41.

The oil passage 42 is, in effect, a vertical tube to one side of the oil chamber 41, communicating with the oil chamber 41 by means of the bottom offset portion 63 and separated from the main portion of the oil passage 42 by the check valve 64. The check valve consists of a centrally apertured restricting baffle 65 between the upper and lower portions of the oil passage 42. This baffle, at its upper end, has a valve seat 66. A ball valve 67 is normally seated on the valve seat 66. The upper portion of the oil passage 42 communicates with the threaded passage 32 in the head 11.

The bowl 12 may be made from any suitable material but preferably it is fabricated of a transparent plastic, thereby providing visual observation of the oil level in the oil chamber 41. It will be recognized that other materials may be used for fabrication of the bowl 12 without departure from the principles of this invention.

To facilitate proper indexing of the bowl 12 to the head 11, one or more locating pins 68 may be provided (Fig. 2).

C. Regulator valve

The baffle 25 has an aperture 70 extending through it. Seated in this aperture is the regulator valve assembly 71 (Fig. 2). The details of regulator valve assembly 71 may be more clearly seen by reference to Figs. 6 and 7.

The regulator valve assembly includes an external, tubular sleeve 72 press-fitted into the aperture 70 in the baffle 25. Press-fitted into one end of the sleeve 72 is a centrally apertured, first end plug 73, having on its inside face a valve seat 74 surrounding the central aperture 75. Cut into the valve seat 74 are one or more by-pass slots 76. These slots are of very small cross section to permit only a minute flow of air around the ball valve 77 when the ball valve is seated.

Press-fitted into the opposite end of the sleeve 72 is a second, centrally apertured, end plug 78, having a central passageway 79 at the inner end of which is a valve seat 80. The valve seat 80, like the valve seat 74, has at least one by-pass slot 81 to permit the gradual flow of air around the ball valve 77 when it is seated against the valve seat 80.

The second end plug 78 forms an annular channel 82 into which is seated one end of a coiled spring 83. The coil spring 83 presses against the ball valve 77 and biases it toward the first end plug 73. However, upon any appreciable pressure differential acting in the opposite direction, the ball will be caused to shift from valve seat 74 to valve seat 80 against the resistance of the spring 83. The purpose of this will be brought out more fully hereinafter.

The regulator valve assembly 71 is so mounted in the aperture 70 that the first end plug 73, towards which the ball valve 77 is normally biased, is adjacent the collection chamber 40. While the aperture 70 is shown as inclined, this is not functionally necessary, it being merely to provide access for machining the aperture 70.

D. The oil feeder

The oil feeder 90 has an externally threaded shell 91 within the upper portion of which is a central chamber 92 opening through the upper end of the shell (Fig. 8). The central chamber 92 communicates with the lower end of the oil feeder by means of a central passageway 93 extending from the bottom of the chamber through the bottom end of the shell. At its lower end, the shell is provided with a tool slot 96 to facilitate its installation and subsequent adjustment. Seated within the chamber 92 is an elongated, annular restrictor sleeve 94, extending through the center of which is an opening forming a central reservoir 95 (Figs. 8 and 9). The reservoir opening 95 communicates with the upper end of the channel 93 in the lower end of the shell 91.

The restrictor sleeve 94 may be made of any suitable, porous material such as a sintered metal, porous ceramic, felt or resin stabilized, cellulosic fibers such as paper or cloth. The restrictor must be characterized by its ability to pass oil from the reservoir 95 to its external surface in small quantities by either percolation or capillary action. It is not intended that this invention should be restricted by the particular material chosen for the restrictor, the limitations being upon the capacity of the material to permit the restrictive flow of the lubricant from the chamber 95 to the external surface of the restrictor. It is, however, important that the material be capable of preventing the flow of oil across its thickness when there is no pressure differential between the inside and outside of the restrictor such as occurs when air is not flowing in the air passage 14.

With the restrictor sleeve 94 installed within the chamber 92, the upper end of the chamber is closed by means of a cap 97 press-fitted onto the shell 91. Preferably the cap 97 is slightly smaller in diameter than the shell 91 and is not threaded, whereby it will not interfere with installation of the oil feeder in the threaded passage 32.

The walls of the shell 91 are breached by at least one axially extending, narrow slot 98. In the particular arrangement shown, two diametrically positioned slots 98 are utilized. It will be understood that the number of slots employed will depend upon the minimum quantity of oil it is desired to discharge from the oil feeder into the air stream. The greater the minimum desired, the greater the number of slots. The slots 98 extend through the walls of the shell 91 and provide direct communication between the air passage 14 and the external surface of the restrictor sleeve 94 by which oil may be withdrawn from the external surface of the restrictor into the air stream in the air passage 14. These slots normally extend from the lower surface of the cap almost to the bottom of the chamber 92.

While a narrow slot is one of the most effective ways of providing a lubricant discharge opening in the side of the shell 91, it is not the only type of opening having utility in this invention. A plurality of small holes, preferably arranged in a pattern axially of the shell may be substituted for the slot. Other types of openings may be employed if their use is advantageous.

Where one or two openings are used in the shell such as the slots 98, it is entirely possible to effectively restrict the rate of flow of the oil simply by covering the slots with strips of the same type of material from which the restrictor sleeve 94 is manufactured.

E. Modifications

Fig. 10 shows a modified structure for the check valve 64. In check valve 64a, the restricting baffle 65a at the lower end of the oil passage 42a has a substantially larger central opening than exists in the baffle 65. An insert 100 having a valve seat already machined into it is press-fitted into the opening in the baffle 65a. This arrangement has the advantage of permitting the valve seat to be precisely machined to close tolerances as a separate part where such an operation is readily accessible. In the arrangement illustrated in Fig. 2, the valve seat 66 is at the far end of a long passage making it difficult to use tools accurately at this point. Thus, a tight fit between the ball valve 67 and its seat is difficult to obtain. Further, in the illustrated modification, the ball is biased against the seat 67 by a very light coil spring 101, the lower end of which bears against the ball valve 67 and the upper end against the bottom of the oil feeder 90. The spring 101 serves to positively seat the ball 67 even though the column of oil trapped in the oil passage 42a is so short that the ball's weight combined with that of the oil column may, at times, be insufficient to form a fluid tight seal between the ball valve and its seat.

Fig. 11 illustrates another modification of the check valve. In this case the check valve assembly 64b is similar to the check valve assembly 64a inasmuch as the same restrictor baffle 65a and separate valve seat insert 100 are utilized. The same ball valve 67 is also utilized. However, the lower end of the oil passage 42b is of slightly smaller diameter into the upper portion of which is press-fitted a centrally apertured collar 102. The collar serves as the upper bearing member for the coil spring 101a. By this arrangement, a much shorter coil spring may be utilized and thus the force with which it biases the ball valve 67 against its seat may be more closely controlled.

Fig. 12 illustrates a modification in which the collection chamber 40a and the oil chamber 41a of the bowl 12a are not connected. This is done by elimination of the aperture 70 through the baffle 25. In place of the aperture 70, a minute aperture 110 is provided through the wall 111 in the head, dividing the air passage 14 from the oil chamber 41a. The aperture 110 communicates with the air passage 14 downstream of the filter 16 but upstream of the restricted throat 30. Thus, there will be a pressure differential between the air entering the oil chamber 41 through the aperture 110 and the air surrounding the oil feeder 90 due to the Venturi action of the throat 30. It will be seen from the following description under the heading "Operation" that this pressure differential is essential to the operation of this device. When this arrangement is used, it is unnecessary to utilize the collection chamber 40 in order to effectively operate the lubricating unit.

Operation

This invention is designed to be installed in an air line feeding one or more pneumatically operated devices such as tools. The air, under pressure, enters through the inlet port 23 and discharges through the outlet port 31. Normally, the air entering the port 23 is under a pressure of about 90 p. s. i. While this is the conventional pressure rating at which devices of this type operate, it is not essential that this particular pressure be utilized. Practically the entire volume of air entering through the inlet port 23 passes through the filter 16 and discharges through the discharge port 31. Due to the resistance of the filter 16, a pressure drop of approximately ½ to 1 p. s. i. occurs across the filter. Any water and foreign particles present in the entering air are removed by the filter. Because of the sloping walls of the filter, these particles are urged to discharge through the upstream end of the filter through the funnel 50 into the collection chamber 40.

Conventional air filters employed in supply lines for tools have the filter mounted at a right angle to the primary air stream. This requires the air to traverse a first right angle bend to reach the filter and to traverse at least two more sharp turns, which may or may not be a full 90 degrees, in passing through the filter. Thereafter, the air must turn 270 degrees in order to return to the passageway before discharging from the filter unit. Air, like all other fluids, resists such radical changes in flow direction. As a result an appreciable amount of the energy of the air is lost in traversing the tortuous path, this loss being expressed as a pressure drop. By the utilization of an inline or axial filter as employed in this invention, this energy loss or pressure drop is markedly reduced since the air need only traverse the two directional changes necessitated by its passage through the walls of the filter. Thus, the unit illustrated in this invention, is, for this reason alone, a marked improvement over and substantially more efficient than the conventional units now in operation. This reduction in pressure drop means greater efficiency in the tool's operation because it requires a smaller volume of air to develop a given torque value. However, it is important that a certain amount of pressure differential does occur across the filter in order to operate this invention, particularly if the restricted throat 30 is not employed. This will be discussed more fully hereinafter.

The water and solid particles removed from the air by the filter 16 are discharged into the collection chamber 40. These periodically can be removed by flushing or any other suitable method when the drain cock 56 is opened.

The oil chamber 41 serves as an oil reservoir. The volume of oil in the chamber can easily be observed externally of the bowl if the bowl is of a transparent material or is provided with a transparent panel. The oil in the chamber 41 will normally lift the ball valve 67 of the check valve 64 permitting it to fill the oil passage 42. Due to the weight of the ball, unless there is a pressure differential between the two chambers, the chamber 42 will not be filled to the same level as the chamber 41.

As soon as air under normal operating pressure is turned on, the air passage 14 becomes filled. Immediately the collection chamber 40 will be filled with air under pressure. This air will pass through the regulator valve 71 to place the air above the oil in the oil chamber 41 under a similar pressure. This will upset the check valve 64, causing not only the passageway 42 to be filled, but forcing oil up into the reservoir opening 95 of the restrictor 94. This reservoir will be entirely filled and any air trapped in its upper end will be discharged by percolation through the walls of the restrictor 94. If this does not occur immediately it will occur as soon as the tool is turned on and air starts flowing through the air passage 14. This occurs because of a pressure differential between the air bearing down on the surface of the oil in the oil chamber 41 and the air pressure surrounding the end of the oil feed 90, projecting into the air passage 14. This pressure differential is due either to the pressure drop across the filter element 16 or to the Venturi action of the restrictor 30 or both. The greater this difference, the more forcibly the oil will be pressed up into the reservoir 95.

When the system becomes stabilized by the oil chamber 42 being filled and the air pressure in both the oil chamber 41 and the collection chamber 40 being equalized, the ball valve 77 of the regulator valve 71 will seat under the urging of the spring 83 against the end insert 73. So long as the machine is operating normally, the ball will remain in this position. Oil will be gradually completely withdrawn through the oil feeder 90 into the air stream. As this oil is withdrawn it will be replaced by oil from the oil chamber 41. By means of the by-pass slots 76 in the seat 74 of the regulator valve 71 air will be admitted to the oil chamber to compensate for the volume of oil discharged through the oil feeder 90. Since the rate of discharge of oil through the oil feeder is normally very small, being in the neighborhood normally of approximately 0.10 ounce per hour, the minuteness of the slot 76 will not interfere with the entrance of adequate quantities of air to stabilize the pressure in the oil chamber.

For any reason, should a major imbalance occur between the collection and oil chambers with the oil chamber having a pressure substantially below that of the collection chamber the ball valve 77 will immediately shift to seat against the end insert 78 (Fig. 6). In so doing it will permit a surge of air to pass through, normally sufficient to re-establish the equilibrium between the chamber. If the equilibrium is not thus re-established, air will continue to bleed into the oil chamber through the by-pass slots 81 to re-establish the equilibrium. Before this equilibrium is re-established, the ball will shift back to seat against the first end insert 73 under the urging of the spring 83.

This situation occurs when the oil chamber is opened for filling without the air line supplying the device being shut off. In this case, the cap 62 is loosened sufficiently to allow the air in the oil chamber 41 to escape. This quickly causes the ball valve 77 to shift. The cap 62 can then be removed and the oil chamber 41 filled. The amount of air entering the chamber by way of the by-pass slots 81 is so small that it will not interfere with operation. When the chamber has been filled, the cap 62 is replaced and the continued flow of air through the by-pass slots 81 will gradually re-establish equilibrium in air pressure between the two chambers.

While the oil chamber is open for filling, the check valve 64 will seat, preventing escape of the column of oil in the passageway 42. This provides a supply for the oil feeder 90 during the filling operation. The oil feeder 90 will continue to supply oil to the air stream inasmuch as the reservoir 95 within the restrictor 94 will be full and until this supply is exhausted, effective lubrication will be maintained. The reservoir capacity of the oil feeder and the rate of oil discharge are such that the oil feeder has a supply which will last many times the length of the period necessary to fill the oil chamber 41. After filling, the check valve 64 will usually open as soon as pressure is reestablished on the surface of the oil in the oil chamber to replace the oil removed through the oil feeder 90 while the oil chamber 41 was being filled. It is seen that this device thus permits the oil chamber to be filled and serviced without interrupting the operation of the tool, both because filling may be done without shutting off the air supply and without interfering with the discharge of lubricant into the air stream.

Since the oil feeder 90 is externally threaded, it is vertically adjustable within the threaded passage 32. A lesser or greater length of the oil feeder 90 may be exposed in the air passage 14. This, of course, will determine the length of the slot 98 exposed to the wiping action of the air passing through the air passageway and thus the volume of oil discharged into the air stream. This adjustment must be made before the bowl is attached to the head. This being the case, this adjustment cannot be changed by the operator during the operation of the tool.

In the oil feeder 90, were the restrictor not present, the oil would be rapidly removed in large quantities through the slot 98. The restrictor functions to prevent the discharge of excess quantities of oil into the air stream. Since only that portion of the restrictor exposed through the slot is available for wiping, the rate of discharge is effectively controlled. It will be recognized that the function of the restrictor can, to some extent, be performed by the utilization of a few minute openings in the wall of the shell 91. Such an arrangement, however, is far less satisfactory because such openings have a tendency to become blocked by even minute foreign particles, interfering with the rate of lubrication and endangering expensive equipment. Further, such orifices, unless they are of capillary size, will permit the slow discharge of oil into the air passage 14 when the air stream in the passageway is not operating. Both of these difficulties are overcome by the use of the porous restrictor sleeve. Further, the porous restrictor is less expensive to manufacture than an element having the minute orifices.

The porous member 94 of the restrictor also serves as a filter for the oil, removing all traces of foreign matter which may be present.

It will be recognized that in some operations the use of the collection chamber 40a may be considered unnecessary. In this situation the air pressure differential necessary to force the oil from the oil chamber 41a into the oil passage 42 (Fig. 12) may be supplied directly from the air passage 14 by the use of the orifice 110. With the orifice 110 placed on the downstream side of the filter 16, a pressure differential will occur between the air in the oil chamber 41a and the air surrounding the oil feeder 90 due to the Venturi action of the throat 30. This will be sufficient to induce oil to form a column in the oil passage 42 and to fill the reservoir within the oil feeder 90. In the arrangement shown in Fig. 2 the use of a restricted throat between the filter 16 and the discharge port 31 is not essential, since sufficient pressure differential normally occurs across the filter 16 to operate the lubricating mechanism. However, in the construction shown in Fig. 12, the restricted throat 30 is essential to create the necessary pressure differential. It is entirely possible in this device to eliminate the filter 16 and to supply air directly from the passage 14 ahead of the restricted throat 30 to the oil chamber 41a. In this case the device would serve purely and simply as a lubricator. In those situations in which the filter is used but the air is introduced to the oil chamber from an orifice communicating with the passageway 14 ahead of the filter the restricted throat 30 can be eliminated (Fig. 13). Each of these particular arrangements is no more than a modification of this invention embodying a portion of its principles and permitting the invention to be adapted to particular job requirements.

It will be recognized that these and other modifications of this invention may be made each without departing from the principles disclosed herein. Each of these modifications is to be considered as included in the hereinafter appended claims unless these claims by their language expressly state otherwise.

I claim:

1. A combination air filter and lubricator comprising: a head; an air passage through said head having an inlet port at one end and an outlet port at the other end, said air passage being straight; a filter element in said air passage intermediate said ports; a bowl and means for securing said bowl to said head; said bowl having a collection chamber and an oil chamber communicating at their upper ends independently of said air passage; said collection chamber communicating with said passage between said inlet port and said filter element; an oil feeder adapted to receive oil from said oil chamber and extending into said air passage between said filter and said outlet port.

2. A combination air filter and lubricator comprising: a head; an air passage through said head having an inlet port at one end and an outlet port at the other end, said air passage being straight; a filter element in said air passage intermediate said ports; a bowl and means for securing said bowl to said head; said bowl having a collection chamber and an oil chamber communicating at their upper ends independently of said first air passage; said collection chamber communicating with said passage between said inlet port and said filter element; an oil passage communicating with said oil chamber and with said air passage between said filter element and said outlet port; an oil feeder seated in said oil passage and extending into said air passage.

3. A combination air filter and lubricator as recited in claim 2 wherein said oil feeder is adapted for adjustment axially of said oil passage.

4. A combination air filter and lubricator comprising: a head having a straight air passage therethrough, said air passage terminating in an inlet port at one end and an outlet port at the other end; a filter element in said air passage intermediate said ports; a bowl and means for securing said bowl to said head; said bowl having a collection chamber and an oil chamber communicating at their upper ends independently of said air passage; said collection chamber communicating with said passage between said inlet port and said filter element; an oil feeder adapted to receive oil from said oil chamber and extending into said air passage between said filter and said outlet port.

5. A combination air filter and lubricator comprising: a housing having in its upper portion a straight air passage therethrough, said air passage terminating in an inlet port at one end and an outlet port at the other end; a filter element in said air passage intermediate said ports; the lower portion of said housing having an oil chamber and a collection chamber; a port providing communication between said chambers at the upper ends thereof independently of said air passage; said collection chamber communicating with said passage between the said inlet port and said filter element; an oil feeder adapted to receive oil from said oil chamber and extending into said air passage between said filter and said outlet port.

6. A combination air filter and lubricator comprising: a head; an air passage through said head having an inlet port at one end and an outlet port at the other end, said air passage being straight; a filter element in said air passage intermediate said ports; a bowl and means for securing said bowl to said head; said bowl having a collection chamber and an oil chamber and a restricted port providing communication between said chambers at their upper ends; said restricted port being adapted to allow the gradual flow of air in both directions between said chambers independently of said air passage; an oil feeder adapted to receive oil from said oil chamber and extending into said air passage between said filter and said outlet port.

7. A combination air filter and lubricator as described in claim 6 wherein said restricted port has a pair of valve seats and a valve member movable between said seats; a resilient member urging said valve member toward said valve seat adjacent said collection chamber; a bleed orifice in each of said seats adapted to permit the gradual by pass of air around said valve member when seated against either of said seats.

8. A combination air filter and lubricator comprising: a head; an air passage in said head having an inlet port at one end and an outlet port at the other end; a filter element in said passage intermediate said ports; a bowl and means for securing said bowl to said head; said bowl having a collection chamber and an oil chamber communicating at their upper ends independently of said air passage via a port between said chambers at their upper ends; a two-way air flow regulator valve in said port; an oil feeder adapted to receive oil from said oil chamber and extending into said air passage between said filter and said outlet port.

9. A combination air filter and lubricator comprising: a head; a straight air passage in said head having an inlet port at one end and an outlet port at the other end; a filter element in said passage intermediate said ports; a bowl and means for securing said bowl to said head; said bowl having a collection chamber and an oil chamber communicating at their upper ends independently of said air passage; said collection chamber communicating with said passage between said inlet port and said filter element; an oil passage communicating with the lower portion of said oil chamber; a check valve in said oil passage adapted to admit oil to said oil passage; an oil feeder adapted to receive oil from said oil passage; one end of said oil feeder extending into said oil passage.

10. A combination air filter and lubricator comprising: a head; a straight air passage in said head having an inlet port at one end and an outlet port at the other end; a filter element in said passage intermediate said ports; a bowl and means for securing said bowl to said head; said bowl having a collection chamber and an oil chamber communicating at their upper ends independently of said air passage; said collection chamber communicating with said passage between said inlet port and said filter element; an oil channel communicating with the lower end of said oil chamber; a check valve in said channel adapted to admit oil to said channel and to maintain a column of oil therein; a capillary feeder communicating with the upper end of said channel, the upper end of said feeder extending into said air passage between said filter element and said outlet port.

11. A combination air filter and lubricator comprising: a housing having in its upper portion a straight air passage therethrough, said air passage terminating in an inlet port at one end and an outlet port at the other end; a filter element in said air passage intermediate said ports; the lower portion of said housing having a collection chamber, an oil chamber and an oil passage communicating with the lower portion of said oil chamber; a port providing communication between said chambers at the upper ends thereof; a two-way air flow regulator valve in said port; a one way check valve at the lower end of said oil passage, said check valve adapted to admit oil to said oil passage; an oil feeder seated in the upper end of said oil passage; one end of said oil feeder extending into said air passage between said filter element and said outlet port whereby differential air pressure across said filter element will force oil past said check valve to fill said oil passage.

12. A combination filter and lubricator for air operating under pressure comprising: a head having a straight air passage therethrough, said air passage terminating in an inlet port at one end and an outlet port at the other end; a filter element in said passage intermediate said ports, said filter element being adapted to create a differential in air pressure between said inlet and outlet ports; a bowl secured to said head, said bowl having a baffle dividing said bowl into a collection chamber and an oil chamber; an oil feeder adapted to receive oil from said oil chamber and extending into said air passage in a zone thereof between said filter and said outlet port; port means providing communication between said oil chamber and a zone of said air passage between said inlet port and said filter.

References Cited in the file of this patent

UNITED STATES PATENTS

| | | |
|---|---|---|
| 881,483 | Olsen et al. | Mar. 10, 1908 |
| 1,012,114 | Templeton | Dec. 19, 1911 |
| 1,074,867 | Jones | Oct. 7, 1913 |
| 1,990,524 | Bystricky | Feb. 12, 1935 |
| 2,560,239 | O'Farrell | July 10, 1951 |
| 2,680,496 | Johnson | June 8, 1954 |
| 2,698,064 | Streicker et al. | Dec. 28, 1954 |
| 2,730,269 | Earle et al. | Jan. 10, 1956 |